US010073901B2

(12) United States Patent
Yamagishi et al.

(10) Patent No.: US 10,073,901 B2
(45) Date of Patent: Sep. 11, 2018

(54) INFORMATION PROCESSING APPARATUS, INFORMATION PROCESSING METHOD, PROGRAM, AND CONTENT SHARING SYSTEM

(71) Applicant: Saturn Licensing LLC, New York, NY (US)

(72) Inventors: Yasuaki Yamagishi, Kanagawa (JP); Hirokazu Tsuchiya, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 331 days.

(21) Appl. No.: 14/424,666

(22) PCT Filed: Aug. 26, 2013

(86) PCT No.: PCT/JP2013/072642
§ 371 (c)(1),
(2) Date: Feb. 27, 2015

(87) PCT Pub. No.: WO2014/038413
PCT Pub. Date: Mar. 13, 2014

(65) Prior Publication Data
US 2015/0254317 A1 Sep. 10, 2015

(30) Foreign Application Priority Data

Sep. 6, 2012 (JP) ................................ 2012-195765

(51) Int. Cl.
*G06F 7/00* (2006.01)
*G06F 17/30* (2006.01)
(Continued)

(52) U.S. Cl.
CPC .. *G06F 17/30575* (2013.01); *G06F 17/30569* (2013.01); *G06F 17/30864* (2013.01);
(Continued)

(58) Field of Classification Search
None
See application file for complete search history.

(56) References Cited

U.S. PATENT DOCUMENTS

2002/0162118 A1 10/2002 Levy et al.
2005/0262548 A1 11/2005 Shimojo et al.
(Continued)

FOREIGN PATENT DOCUMENTS

CA 2 814 197 A1 5/2012
CN 1754159 A 3/2006
(Continued)

OTHER PUBLICATIONS

Japanese Office Action dated Jun. 28, 2016 in Patent Application No. 2012-195765 (with English Translation).
(Continued)

*Primary Examiner* — Thu Nga Nguyen
(74) *Attorney, Agent, or Firm* — Oblon, McClelland, Maier & Neustadt, L.L.P.

(57) ABSTRACT

The present disclosure relates to an information processing apparatus, an information processing method, a program, and a content sharing system that allow for efficient use of an ACR service when content is shared.

An information processing apparatus in the present disclosure includes an identification request unit for extracting first signature data from acquired content, transmitting a query including the first signature data to a content identification server, and receiving a response including results of identification of the content returned from the content identification server in response to the query, a signature data insertion unit for transforming the response into response transformed data, generating second signature data that can be extracted by a different information processing apparatus with the response transformed data contained therein, and inserting the second signature data into the acquired content, (Continued)

and a provision unit for providing the content in which the second signature data is inserted to the different information processing apparatus.

13 Claims, 9 Drawing Sheets

(51) Int. Cl.
    *H04N 21/234* (2011.01)
    *H04N 21/44* (2011.01)
    *H04N 21/43* (2011.01)
    *H04N 21/81* (2011.01)
    *H04N 21/8358* (2011.01)

(52) U.S. Cl.
    CPC ... *H04N 21/23418* (2013.01); *H04N 21/4307* (2013.01); *H04N 21/44008* (2013.01); *H04N 21/8173* (2013.01); *H04N 21/8358* (2013.01)

(56) References Cited

U.S. PATENT DOCUMENTS

| | | | | |
|---|---|---|---|---|
| 2006/0294383 | A1* | 12/2006 | Austel | G06F 21/606 713/176 |
| 2007/0124796 | A1 | 5/2007 | Wittkotter | |
| 2008/0310731 | A1* | 12/2008 | Stojancic | G06K 9/00711 382/195 |
| 2010/0088734 | A1 | 4/2010 | Dewa et al. | |
| 2010/0318515 | A1* | 12/2010 | Ramanathan | G06F 17/30799 707/723 |
| 2012/0265735 | A1* | 10/2012 | McMillan | H04N 21/8352 707/687 |
| 2012/0284740 | A1* | 11/2012 | Park | H04N 21/23418 725/19 |

FOREIGN PATENT DOCUMENTS

| | | |
|---|---|---|
| CN | 102572574 A | 7/2012 |
| DE | 10 2005 056 551 A1 | 6/2006 |
| JP | 2006-50237 A | 2/2006 |
| JP | 2006-270634 A | 10/2006 |
| JP | 2008-263502 A | 10/2008 |
| JP | 2010-239345 A | 10/2010 |
| RU | 2 238 614 C2 | 10/2004 |
| WO | WO 2012/088308 A2 | 6/2012 |
| WO | WO 2012/111514 A1 | 8/2012 |

OTHER PUBLICATIONS

International Search Report dated Oct. 29, 2013 in PCT/JP2013/072642.
Extended European Search Report dated Mar. 2, 2016 in Patent Application No. 13835708.2.
Combine Russian Federation Office Action and Search Report dated Dec. 7, 2016 in Patent Application No. 2015106888/07(011130) (with partial English translation and English translation of categories of cited documents).
Combined Chinese Office Action and Search Report dated Jun. 26, 2017 in Chinese Patent Application No. 201380044789.4 (with English translation).

* cited by examiner

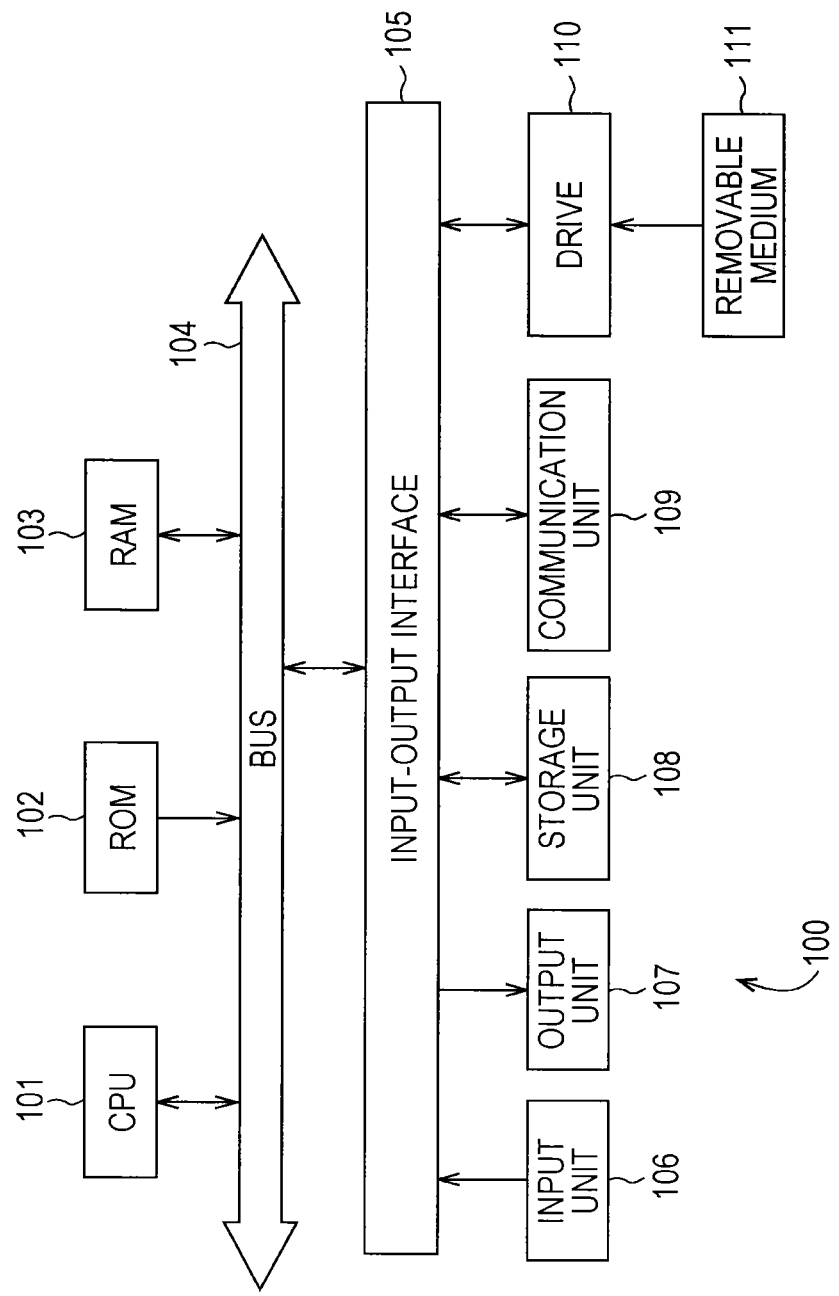

INFORMATION PROCESSING APPARATUS, INFORMATION PROCESSING METHOD, PROGRAM, AND CONTENT SHARING SYSTEM

TECHNICAL FIELD

The present disclosure relates to an information processing apparatus, an information processing method, a program, and a content sharing system, and more particularly, to an information processing apparatus, an information processing method, a program, and a content sharing system suitable for use in the identification of content being viewed on the terminal side.

BACKGROUND ART

For example, consider, when a television (TV) program is being viewed, displaying on a screen information related to the TV program (hereinafter, simply referred to as program) (such as performers, an outline, or an announcement of the next episode), information useful for a viewer but not directly relevant to the program (such as news, a weather forecast, or traffic information), or the like.

This can be implemented by transmitting a command for a dedicated application program (hereinafter, abbreviated as application) to be acquired and started to a TV receiver or the like in synchronization with the progress of the program. This has actually been implemented in Japan, Europe, and others by transmitting the command and an application using a band for data broadcasting in a TV broadcast signal (for example, see Patent Document 1).

On the other hand, in the United States, a band for data broadcasting is not provided in a TV broadcast signal, and an alternative method has not been established. Thus it has not been implemented to execute an application in synchronization with the progress of a program.

In the United States, the number of households that view programs via CATV, IPTV, or the like is greater than the number of households that view programs by directly receiving TV broadcast waves by TV receivers. CATV and IPTV sometimes extract only video and audio signals of programs from TV broadcast signals for distribution. Therefore, even if a band for data broadcasting is provided in a TV broadcast signal in the United States, there will be no guarantee that data broadcast signals in which data on applications is included are transmitted to receiving apparatuses via a communication network of CATV or IPTV.

Further, these days, when any content such as a recorded program, a video reproduced from a package medium such as a DVD or a BD, or moving images downloaded from the Internet, as well as a program being broadcast in real time, is being viewed, there is a desire to execute an application in synchronization with the progress thereof.

In order to cause an application to be executed in accordance with the progress of any content being viewed, first, it is necessary to identify the content being viewed. As a method for that, the application of automatic content recognition technology (hereinafter, referred to as ACR) has been conceived.

In ACR, signature data is inserted into content such as a program to be viewed and provided to the viewer side, and at the same time, the content and the signature data are associated with each other to be databased. Then, the viewer side extracts the signature data from the content being viewed, checks it against the database, and thereby identifies the content being viewed.

For the kind of signature data that is inserted into content, provided to the viewer side, and extracted at the time of viewing, for example, a digital fingerprint (hereinafter, referred to as FP), a digital watermark (hereinafter, referred to as WM), or the like is used.

Operators that provide ACR services are not limited to broadcast stations. Various entrants are considered, and as a result, emergence of a plurality of ACR services is expected. The emergence of the plurality of ACR services causes an increase in the number of content registered in the database, so that an improvement in content identification accuracy can be expected. However, the kinds of signature data adopted in the plurality of ACR services are not necessarily unified.

On the other hand, on the viewer side, content identification accuracy can be increased by extracting a plurality of signature data pieces from content being viewed by extraction methods depending on the kinds of signature data adopted in the plurality of ACR services, and using the plurality of ACR services.

CITATION LIST

Patent Document

Patent Document 1: JP 2006-50237 A

SUMMARY OF THE INVENTION

Problems to be Solved by the Invention

These days, there is a system in which a home network in which audio visual (AV) apparatuses are connected to each other is constructed in an ordinary household, and content can be shared between the AV apparatuses connected to the home network. The home network allows for sharing of content in such a manner that content being received and viewed or content recorded by a TV receiver placed in a living room is transferred to a portable tablet computer or a TV receiver in a bedroom to be viewed, for example.

As described above, considering sharing of content via a home network and further using ACR services, AV apparatuses individually access ACR servers in spite of viewing common content, increasing load of the ACR servers. Further, when each AV apparatus uses a plurality of ACR services, an increase in the load of processing for extracting signature data, occurrence of a time delay until identification results are obtained, or the like can cause an application to be synchronized with the progress of content not to be able to be executed at a predetermined timing.

The present disclosure has been made in view of the situation like this, and is intended to allow for efficient use of an ACR service when content is shared.

Solutions to Problems

An information processing apparatus according to a first aspect of the present disclosure is an information processing apparatus that shares content with a different information processing apparatus via a network, which includes: an acquisition unit for acquiring content; an identification request unit for extracting first signature data from the acquired content, transmitting a query including the first signature data to a content identification server, and receiving a response including results of identification of the content returned from the content identification server in response to the query; a signature data insertion unit for transforming the response into response transformed data, generating second signature data that can be extracted by the different information processing apparatus with the response transformed data contained therein, and inserting the second signature data into the acquired content; and a provision unit for providing the content in which the second signature data is inserted to the different information processing apparatus.

The response further includes related metadata in which information representing an application to be executed in synchronization with the progress of the content is contained, and the signature data insertion unit may generate the response transformed data including at least the related metadata included in the response, generate the second signature data with the response transformed data contained therein, and insert the second signature data into the acquired content.

The information processing apparatus according to the first aspect of the present disclosure may further include a management unit for managing the kind of signature data that can be extracted by the different information processing apparatus.

The information processing apparatus according to the first aspect of the present disclosure may further include an execution unit for acquiring and executing the application to be executed in synchronization with the progress of the content, based on the related metadata included in the response.

The first signature data may be an FP, and the second signature data may be a WM.

The first and second signature data may be WMs.

An information processing method according to the first aspect of the present disclosure is an information processing method for an information processing apparatus that shares content with a different information processing apparatus via a network, which includes: by the information processing apparatus, an acquisition step of acquiring content; an identification request step of extracting first signature data from the acquired content, transmitting a query including the first signature data to a content identification server, and receiving a response including results of identification of the content returned from the content identification server in response to the query; a signature data insertion step of transforming the response into response transformed data, generating second signature data that can be extracted by the different information processing apparatus with the response transformed data contained therein, and inserting the second signature data into the acquired content; and a provision step of providing the content in which the second signature data is inserted to the different information processing apparatus.

A program according to the first aspect of the present disclosure causes a computer that shares content with a different information processing apparatus via a network to function as: an acquisition unit for acquiring content; an identification request unit for extracting first signature data from the acquired content, transmitting a query including the first signature data to a content identification server, and receiving a response including results of identification of the content returned from the content identification server in response to the query; a signature data insertion unit for transforming the response into response transformed data, generating second signature data that can be extracted by the different information processing apparatus with the response transformed data contained therein, and inserting the second signature data into the acquired content; and a provision unit for providing the content in which the second signature data is inserted to the different information processing apparatus.

According to the first aspect of the present disclosure, content is acquired, first signature data is extracted from the acquired content, a query including the first signature data is transmitted to a content identification server, and a response including results of identification of the content returned from the content identification server in response to the query is received. Further, the response is transformed into response transformed data, and second signature data that can be extracted by the different information processing apparatus with the response transformed data contained therein is generated. Then, the second signature data is inserted into the acquired content, and the content in which the second signature data is inserted is provided to the different information processing apparatus.

An information processing apparatus according to a second aspect of the present disclosure includes: an acquisition unit for acquiring content provided from a different information processing apparatus; an extraction unit for extracting signature data from the acquired content; and an execution unit for executing predetermined processing, based on response transformed data contained in the extracted signature data.

The response transformed data includes related metadata including information representing an application to be executed in synchronization with the progress of the content, and the execution unit may acquire and execute the application based on the related metadata.

The signature data may be a WM.

An information processing method according to the second aspect of the present disclosure includes: by an information processing apparatus, an acquisition step of acquiring content provided from a different information processing apparatus; an extraction step of extracting signature data from the acquired content; and an execution step of executing predetermined processing, based on response transformed data contained in the extracted signature data.

A program according to the second aspect of the present disclosure causes a computer to function as: an acquisition unit for acquiring content provided from a different information processing apparatus; an extraction unit for extracting signature data from the acquired content; and an execution unit for executing predetermined processing, based on response transformed data contained in the extracted signature data.

According to the second aspect of the present disclosure, content provided from a different information processing apparatus is acquired, signature data is extracted from the acquired content, and predetermined processing is executed, based on response transformed data contained in the extracted signature data.

A content sharing system according to a third aspect of the present disclosure is a content sharing system including a first information processing apparatus and a second information processing apparatus, in which the first information processing apparatus includes: a first acquisition unit for acquiring content; an identification request unit for extracting first signature data from the acquired content, transmitting a query including the first signature data to a content identification server, and receiving a response including results of identification of the content returned from the content identification server in response to the query; a signature data insertion unit for transforming the response into response transformed data, generating second signature data that can be extracted by the second information processing apparatus with the response transformed data contained therein, and inserting the second signature data into the acquired content; and a provision unit for providing the content in which the second signature data is inserted to the second information processing apparatus. The second information processing apparatus includes: a second acquisition unit for acquiring the content provided from the first information processing apparatus; an extraction unit for extracting the second signature data from the acquired content; and an execution unit for executing predetermined processing, based on the response transformed data contained in the extracted second signature data.

According to the third aspect of the present disclosure, by the first information processing apparatus, content is acquired, first signature data is extracted from the acquired content, a query including the first signature data is transmitted to a content identification server, and a response including results of identification of the content returned from the content identification server in response to the query is received. Further, the response is transformed into response transformed data, and second signature data that can be extracted by the second information processing apparatus with the response transformed data contained therein is generated. Then, the second signature data is inserted into the acquired content, and the content in which the second signature data is inserted is provided to the second information processing apparatus. On the other hand, by the second information processing apparatus, the content provided from the first information processing apparatus is acquired, the second signature data is extracted from the acquired content, and predetermined processing is executed, based on the response transformed data contained in the extracted second signature data.

Effects of the Invention

According to the first aspect of the present disclosure, content in which signature data containing response transformed data is inserted can be provided to a different information processing apparatus.

According to the second aspect of the present disclosure, signature data in which response transformed data is contained can be extracted from content.

According to the third aspect of the present disclosure, use of a content identification server by a second information processing apparatus can be reduced.

BRIEF DESCRIPTION OF DRAWINGS

FIG. 9 is a block diagram illustrating a configuration example of a computer.

MODE FOR CARRYING OUT THE INVENTION

Hereinafter, the best mode for carrying out the present disclosure (hereinafter, referred to as embodiment) will be described in detail with reference to the drawings.

[Configuration Example of ACR System]

Figure 1:
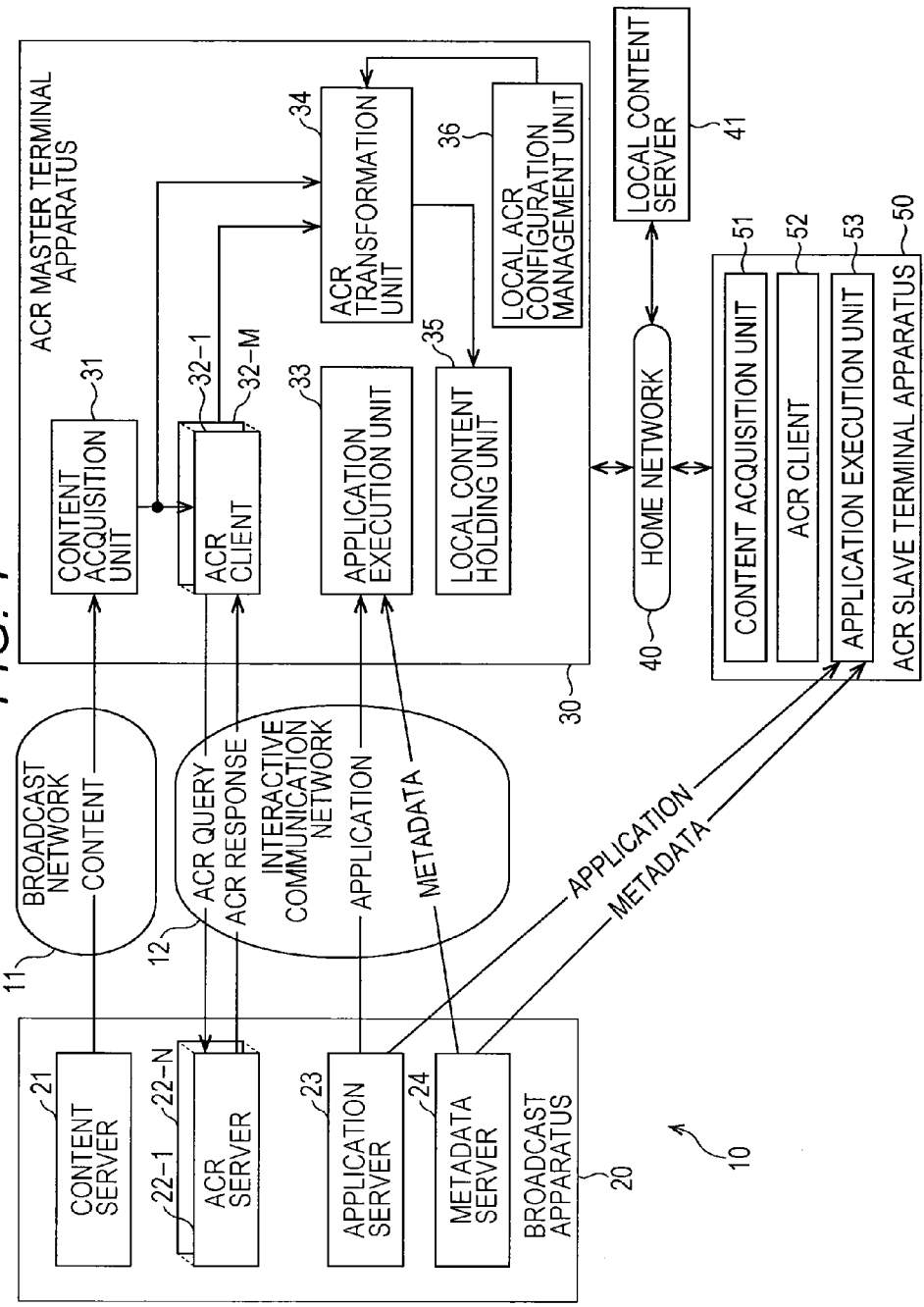
FIG. 1 is a block diagram illustrating a configuration example of an ACR system to which the present disclosure is applied.

FIG. 1 shows a configuration example of an ACR system that is an embodiment of the present disclosure.

The ACR system 10 identifies content a user is viewing with a screen such as a TV receiver as a monitor, using an ACR service, and executes an application in synchronization with the progress of the identified content.

Here, content is not limited to a program being broadcast in real time by TV broadcasting. Examples of the content include various kinds of video data and audio data such as a program recorded and reproduced by a video recorder, a video such as a movie reproduced from a package medium by a multimedia player, and moving images and music downloaded via the Internet. Commercial messages inserted between programs or during a program are also included in the content.

The ACR system 10 includes a broadcast apparatus 20 on the broadcasting side, an ACR master terminal apparatus 30 on the receiving side that is connected to the broadcast apparatus 20 via a broadcast network 11 and an interactive communication network 12, and an ACR slave terminal apparatus 50 that constitutes a home network 40 with the ACR master terminal apparatus 30. The ACR slave terminal apparatus 50 can also be connected to the broadcast apparatus 20 via the broadcast network 11 and the interactive communication network 12 like the ACR master terminal apparatus 30.

The broadcast network 11 refers to a TV broadcast network, a CATV network, an IPTV network, or the like that can provide content to the viewer side. The interactive communication network 12 refers to an IP communication network such as the Internet that can communicate various kinds of electronic data.

[Explanation of Broadcast Apparatus 20]

The broadcast apparatus 20 includes a content server 21, ACR servers 22-1 to 22-N, an application server 23, and a metadata server 24. These servers may be disposed at a single location such as a broadcast station in a concentrated manner, or may be disposed in a distributed manner. Further, these servers may be combined as appropriate for configuration.

The content server 21 provides content to the viewer side (such as the ACR master terminal apparatus 30) via the broadcast network 11. In content provided from the content server 21, signature data (such as FPs or WMs generated by a predetermined method) has previously been inserted.

The ACR servers 22-1 to 22-N have databases in which content and signature data inserted therein are registered in association with each other. The signature data registered in the databases of the ACR servers 22-1 to 22-N is not necessarily unified in its kind. The signature data may be FPs, WMs, and the like, for example.

Even when the resolution, the aspect ratio, the bit rate, the coding format, or the like of content is converted, an FP can be extracted before and after the conversion in the same form. Therefore, using a fingerprint as signature data can increase content identification accuracy.

A WM requires more time for extraction from content compared with an FP, but can contain more digital data.

In the databases, identification information on applications to be executed in synchronization with the progress of content, acquisition destination information on metadata to be processed by the applications, and the like are also registered.

The ACR server 22-*i* (i=1, ..., N) identifies content in response to an ACR query including signature data extracted from the content being viewed, transmitted from a corresponding ACR client 32-*i* of ACR clients 32-1 to 32-M in the ACR master terminal apparatus 30. Further, it generates an ACR response including information on an application to be executed in synchronization with the progress of the content and others, and returns it to the ACR client 32-*i*. The ACR query and the ACR response will be described below.

The application server 23 holds applications to be executed in synchronization with the progress of content on the receiving side, and provides an application via the interactive communication network 12 in response to a request from an application execution unit 33 of the ACR master terminal apparatus 30.

The metadata server 24 holds metadata to be processed by applications executed on the receiving side, and provides metadata via the interactive communication network 12 in response to a request from the application execution unit 33 of the ACR master terminal apparatus 30.

[Explanation of ACR Master Terminal Apparatus 30]

The ACR master terminal apparatus 30 is disposed in a viewer's house or the like, built in an AV apparatus such as a TV reliever or a video recorder constituting a part of the home network 40.

The ACR master terminal apparatus 30 has a content acquisition unit 31, the ACR clients 32-1 to 32-M, the application execution unit 33, an ACR transformation unit 34, a local content holding unit 35, and a local ACR configuration management unit 36.

The content acquisition unit 31 acquires and branches all content to be displayed on a screen such as a TV receiver with the built-in ACR master terminal apparatus 30, or all content in a decoded state to be recorded in a video recorder with the built-in ACR master terminal apparatus 30, to provide it to the ACR clients 32-1 to 32-M and the ACR transformation unit 34. Specifically, the content acquisition unit 31 acquires and branches not only content provided from the content server 21 of the broadcast apparatus 20 via the broadcast network 11 but also content fed via various input terminals (such as an HDMI (registered trademark) terminal) of the TV receiver, the video recorder, or the like.

The ACR client 32-*i* (i=1, 2, ..., M (M≤N)) corresponds to the ACR server 22-*i* of the ACR servers 22-1 to 22-N in the broadcast apparatus 20. That is, the ACR master terminal apparatus 30 having the M ACR clients 32-1 to 32-M can use M of the N ACR servers 22-1 to 22-N. Hereinafter, when it is not necessary to individually distinguish the ACR clients 32-1 to 32-M, they are simply referred to as ACR client 32. The same applies to the ACR servers 22-1 to 22-N.

The ACR client 32 extracts signature data from content fed from the content acquisition unit 31 at predetermined sampling periods, according to an ACR method (representing the kind of the signature data, the extraction method, and the like) adopted in the corresponding ACR server 22. The ACR client 32 generates an ACR query including the extracted signature data for requesting the identification of the content, and transmits it to the corresponding ACR server 22 via the interactive communication network 12.

The ACR client 32 receives and analyzes an ACR response returned from the ACR server 22 in response to the transmitted ACR query, and notifies the application execution unit 33 of analysis results. Further, the ACR client 32 provides the received ACR response to the ACR transformation unit 34.

Based on the results of analysis of the ACR response, the application execution unit 33 acquires an application associated with the content being viewed from the application server 23 via the interactive communication network 12, and executes it. Further, the application execution unit 33 acquires metadata to be processed by the application being executed from the ACR client 32 or the metadata server 24.

The ACR transformation unit 34 generates ACR response transformed data by summarizing the ACR response fed from the ACR client 32. Further, the ACR transformation unit 34 generates signature data that can be extracted by an ACR client 52 of the ACR slave terminal apparatus 50, with the generated ACR response transformed data contained therein.

The signature data that can be extracted by the ACR client 52 of the ACR slave terminal apparatus 50 may be a WM in which ACR response transformed data can be contained. However, as long as being capable of containing ACR response transformed data (digital data), the kind of signature data that can be extracted by the ACR client 52 may be any, and is not limited to a WM.

Further, the ACR transformation unit 34 inserts the signature data (WM) in which the ACR response transformed data from the ACR transformation unit 34 is contained into the content branched and provided by the content acquisition unit 31, and outputs it to the local content holding unit 35.

In some cases, the ACR slave terminal apparatus 50 may be equipped with a plurality of ACR clients 52, or a plurality of AV apparatuses with the built-in ACR slave terminal apparatuses 50 may be connected to the home network 40, and the ACR clients 52 may correspond to their respective different ACR methods. In these cases, signature data for each ACR method may be caused to contain ACR response transformed data, and a plurality of signature data pieces may be inserted into content.

The local content holding unit 35 holds signature data (WMs) in which ACR response transformed data from the ACR transformation unit 34 is contained, and provides it in response to a request from the ACR slave terminal apparatus 50. Content in which signature data (WM) containing ACR response transformed data is inserted may be stored in the local content server 41 belonging to the home network 40.

In the local ACR configuration management unit 36, information representing the ACR server 22 that the ACR slave terminal apparatus 50 connected to the home network 40 can use, in other words, information representing the ACR method in which the ACR client 52 of the ACR slave terminal apparatus 50 can perform extraction is registered. This information is notified from the ACR slave terminal apparatus 50 to the ACR master terminal apparatus 30 when the ACR slave terminal apparatus 50 is connected to the ACR master terminal apparatus 30 for the first time, for example, and registered in the local ACR configuration management unit 36. For the communication of this information, a service discovery protocol, for example, may be used.

[Explanation of ACR Slave Terminal Apparatus 50]

The ACR slave terminal apparatus 50 is built in an AV apparatus such as a tablet computer, a smartphone, or a TV receiver that can be connected to the home network 40.

The ACR slave terminal apparatus 50 has a content acquisition unit 51, the ACR client 52, and an application execution unit 53.

The content acquisition unit 51 acquires and branches all content to be reproduced and displayed on the AV apparatus with the built-in ACR slave terminal apparatus 50, and provides it to the ACR client 52. The content to be reproduced and displayed on the AV apparatus with the built-in ACR slave terminal apparatus 50 includes one provided from the content server 21 of the broadcast apparatus 20 via the broadcast network 11, one shared from the ACR master terminal apparatus 30, and one acquired from the local content server 41. However, hereinafter, reference will be made of content shared from the ACR master terminal apparatus 30.

The ACR client 52 corresponds to one of the ACR servers 22-1 to 22-N of the broadcast apparatus 20, in other words, corresponds to one method of the ACR methods adopted in the ACR servers 22-1 to 22-N. The ACR client 52 notifies the ACR master terminal apparatus 30 of information representing the ACR method that it can use when the ACR slave terminal apparatus 50 is connected to the ACR master terminal apparatus 30 for the first time. The information is registered in the local ACR configuration management unit 36.

The ACR client 52 extracts signature data from content fed from the content acquisition unit 31 and shared from the ACR master terminal apparatus 30 at predetermined sampling periods, according to the ACR method (in the present case, the kind of the signature data is a WM) adopted in the corresponding ACR server 22. Further, the ACR client 32 analyzes ACR response transformed data contained in the extracted signature data, and notifies the application execution unit 53 of analysis results.

When content fed from the content acquisition unit 31 is not one shared from the ACR master terminal apparatus 30, the ACR client 52 can execute processing similar to that of the ACR client 32 of the ACR master terminal apparatus 30. Specifically, it can extract signature data from content, transmit an ACR query including that to the ACR server 22 to request for identification of the content, and receive an ACR response.

Like the ACR master terminal apparatus 30, the ACR slave terminal apparatus 50 may be equipped with a plurality of ACR clients 52 corresponding to the different ACR servers 22.

The application execution unit 53 acquires an application associated with the content being viewed, based on the analysis results on the ACR response transformed data from the application server 23 via the interactive communication network 12, and executes it. Further, the application execution unit 53 acquires metadata to be processed by the application being executed from the ACR client 32 or the metadata server 24.

[About Data Items of Information Communicated]

Next, data items of different kinds of information communicated between the broadcast apparatus 20, the ACR master terminal apparatus 30, and the ACR slave terminal apparatus 50 will be described.

Figure 2:
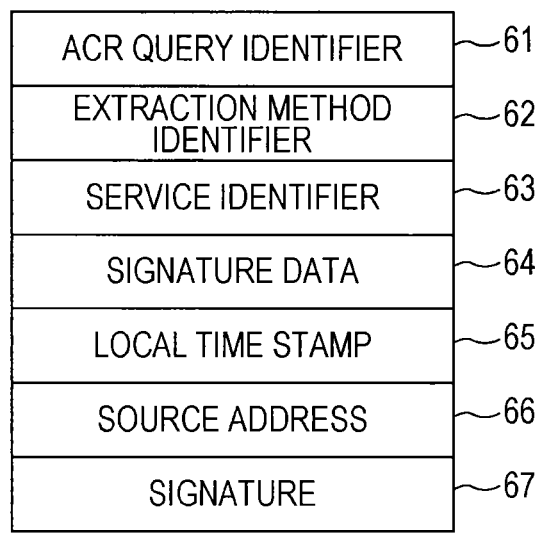
FIG. 2 is a diagram illustrating data items of an ACR query.

FIG. 2 shows data items of an ACR query transmitted when identification of content is requested from the ACR client 32-*i* of the ACR master terminal apparatus 30 (or the ACR client 52 of the ACR slave terminal apparatus 50) to the ACR server 22-*i* of the broadcast apparatus 20.

An ACR query 60 includes an ACR query identifier 61, an extraction method identifier 62, a service identifier 63, signature data 64, a local time stamp 65, a source address 66, and a signature 67.

The ACR query identifier 61 is information uniquely identifying the ACR query 60. The extraction method identifier 62 is information identifying the extraction method used when the signature data 64 is extracted. The service identifier 63 is information for identifying the ACR server 22 to which the ACR query 60 is transmitted and from which an ACR response is received.

The signature data 64 is one extracted from content at the ACR client 32-*i* (or the ACR client 52). The local time stamp 65 indicates a timing at which the signature data 64 was extracted from the content, which is represented by a time indicated by a local system clock of the ACR master terminal apparatus 30 (or the ACR slave terminal apparatus 50).

The source address 66 is an address on the interactive communication network 12 of the ACR client 32-*i* (or the ACR client 52) that transmits the ACR query 60, and is used as a return address of an ACR response generated at the ACR server 22-*i* in response to the ACR query 60. The signature 67 is for preventing falsification of the ACR query 60. The entire ACR query 60 may be encrypted for transmission.

Figure 3:
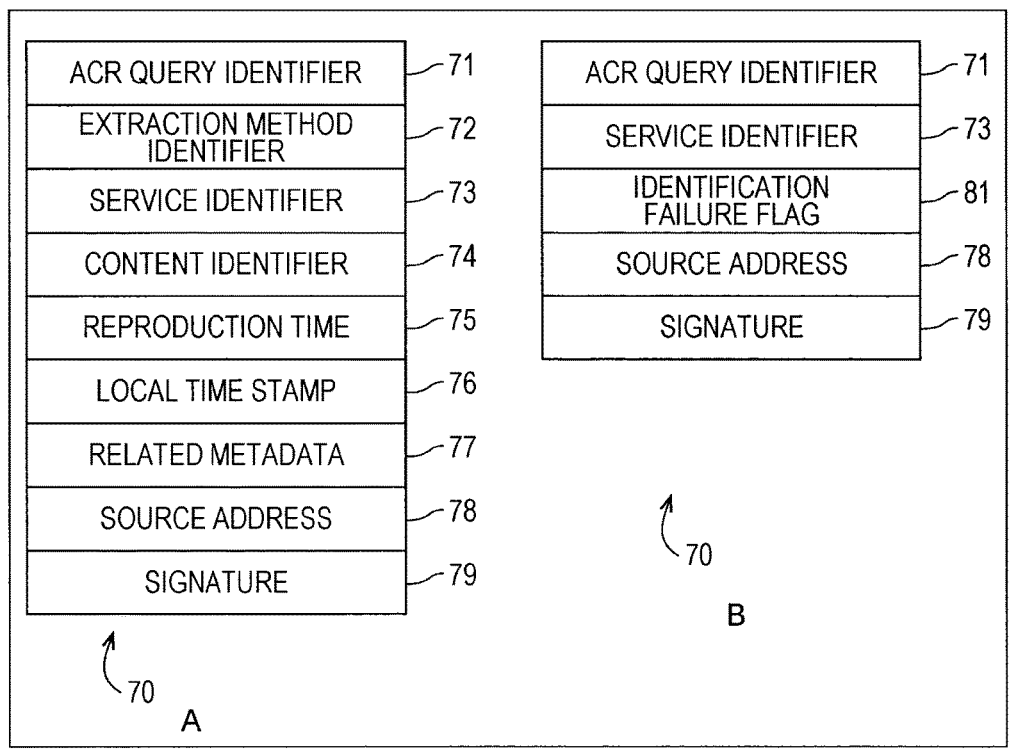
FIG. 3 is a diagram illustrating data items of an ACR response.

FIG. 3 shows data items of an ACR response returned from the ACR server 22-*i* to the ACR client 32-*i* (or the ACR client 52).

A of FIG. 3 shows data items of an ACR response 70 when content at the source of extraction of the signature data 64 included in the ACR query 60 can be identified, that is, when content being viewed at the AV apparatus with the built-in ACR master terminal apparatus 30 can be identified. B of FIG. 3 shows data items of an ACR response 70 when content cannot be identified.

The ACR response 70 (A of FIG. 3) when content can be identified includes an ACR query identifier 71, an extraction method identifier 72, a service identifier 73, a content identifier 74, a reproduction time 75, a local time stamp 76, related metadata 77, a source address 78, and a signature 79.

On the other hand, the ACR response 70 (B of FIG. 3) when content cannot be identified includes an ACR query identifier 71, a service identifier 73, a source address 78, a signature 79, and an identification failure flag 81.

The ACR query identifier 71, the extraction method identifier 72, the service identifier 73, and the local time stamp 76 identify the ACR query 60 having acted as a trigger for the generation of the ACR response 70, which are taken from the ACR query identifier 61, the extraction method identifier 62, the service identifier 63, and the local time stamp 65 of the corresponding ACR query 60.

The content identifier 74 and the reproduction time 75 represent identification results. Specifically, the content identifier 74 is information identifying the content at the source of extraction of the signature data 64 of the ACR query 60. The reproduction time 75 is information representing a timing at which the signature data 64 was extracted from the content by the time elapsed since the beginning of the content.

The related metadata 77 includes an application identifier representing an application to be executed in association with the progress of the identified content and also representing an acquisition destination thereof (application server 23), and metadata to be processed by the application. In place of the metadata, a metadata identifier identifying the metadata and representing an acquisition destination thereof may be contained. The application to be executed may be changed depending on the AV apparatus on which the content is being viewed. In that case, the related metadata 77 is configured to contain a plurality of application identifiers.

The source address 78 is the address on the interactive communication network 12 of the ACR server 22 that transmits the ACR response 70. The signature 79 is for preventing falsification of the ACR response 70. The entire ACR response 70 may be encrypted and then transmitted, thereby preventing falsification thereof.

The identification failure flag 81 is a flag representing that the content at the source of extraction of the signature data 84 included in the ACR query 60 could not be identified in the ACR server 22.

Figure 4:
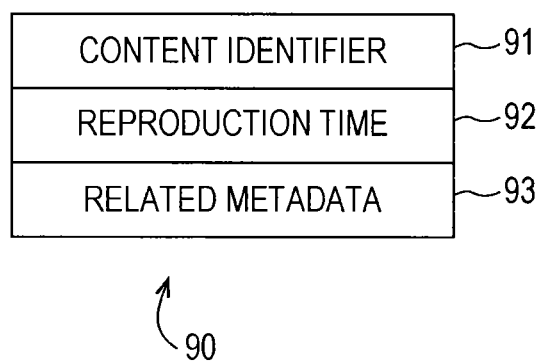
FIG. 4 is a diagram illustrating data items of ACR response transformed data.

FIG. 4 shows data items of ACR response transformed data that the ACR transformation unit 34 of the ACR master terminal apparatus 30 generates by summarizing the ACR response 70 returned from the ACR server 22.

An ACR response transformed data 90 includes a content identifier 91, a reproduction time 92, and related metadata 93. These are taken from the content identifier 74, the reproduction time 75, and the related metadata 77 of the ACR response 70.

[Operation by ACR System 10]

Next, an operation of the ACR system 10 will be described.

Figure 5:
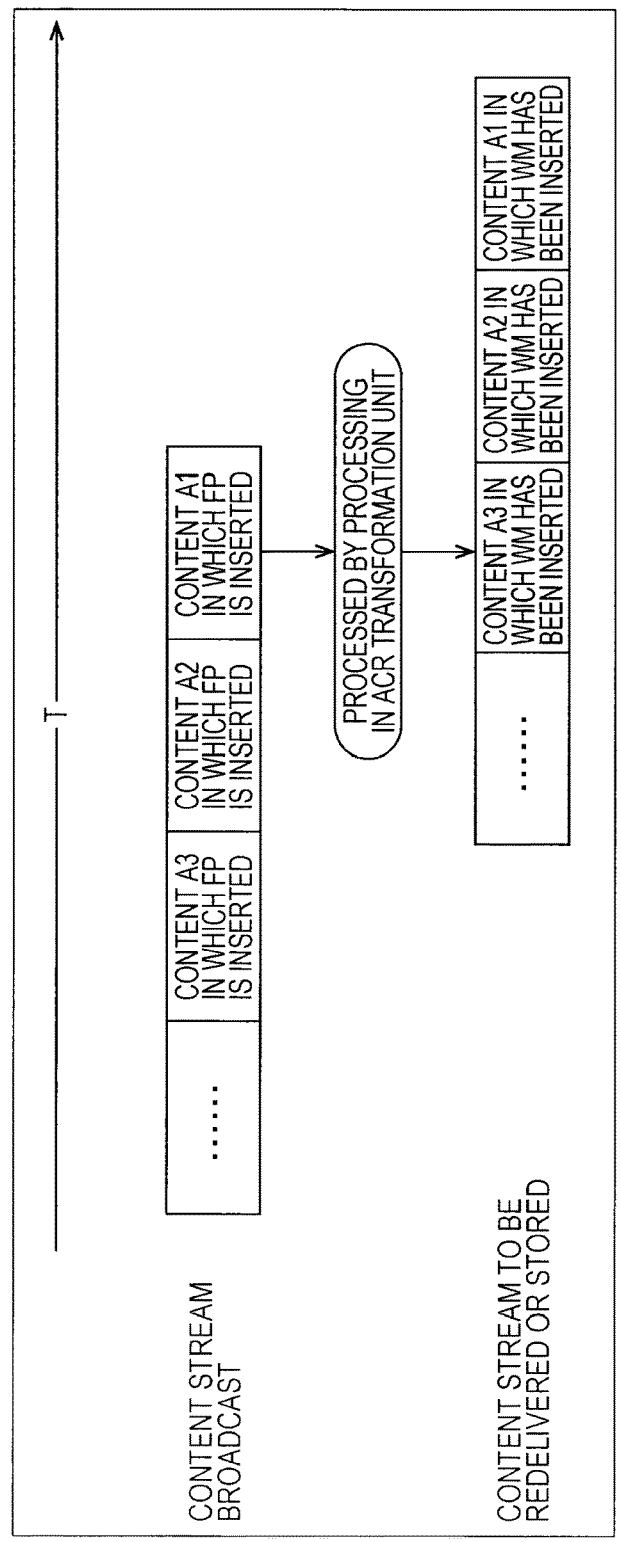
FIG. 5 is a diagram illustrating the outline of processing in an ACR transformation unit.

FIG. 5 shows an outline of processing of the ACR transformation unit 34. In content, an FP is inserted as signature data, for example. The FP is extracted by the ACR client 32 to generate the ACR query 60, in response to which the ACR response 70 is returned. The ACR transformation unit 34 inserts a WM as signature data in which ACR response transformed data is contained into each predetermined unit of content fed sequentially from the content acquisition unit 31, and outputs it to the local content holding unit 35 or the local content server 41 in a later stage.

The ACR slave terminal apparatus 50 that acquires content from the local content holding unit 35 or the local content server 41 extracts signature data by the ACR method that the ACR client 52 uses, thereby being able to acquire the ACR response transformed data 90 contained therein.

Figure 6:
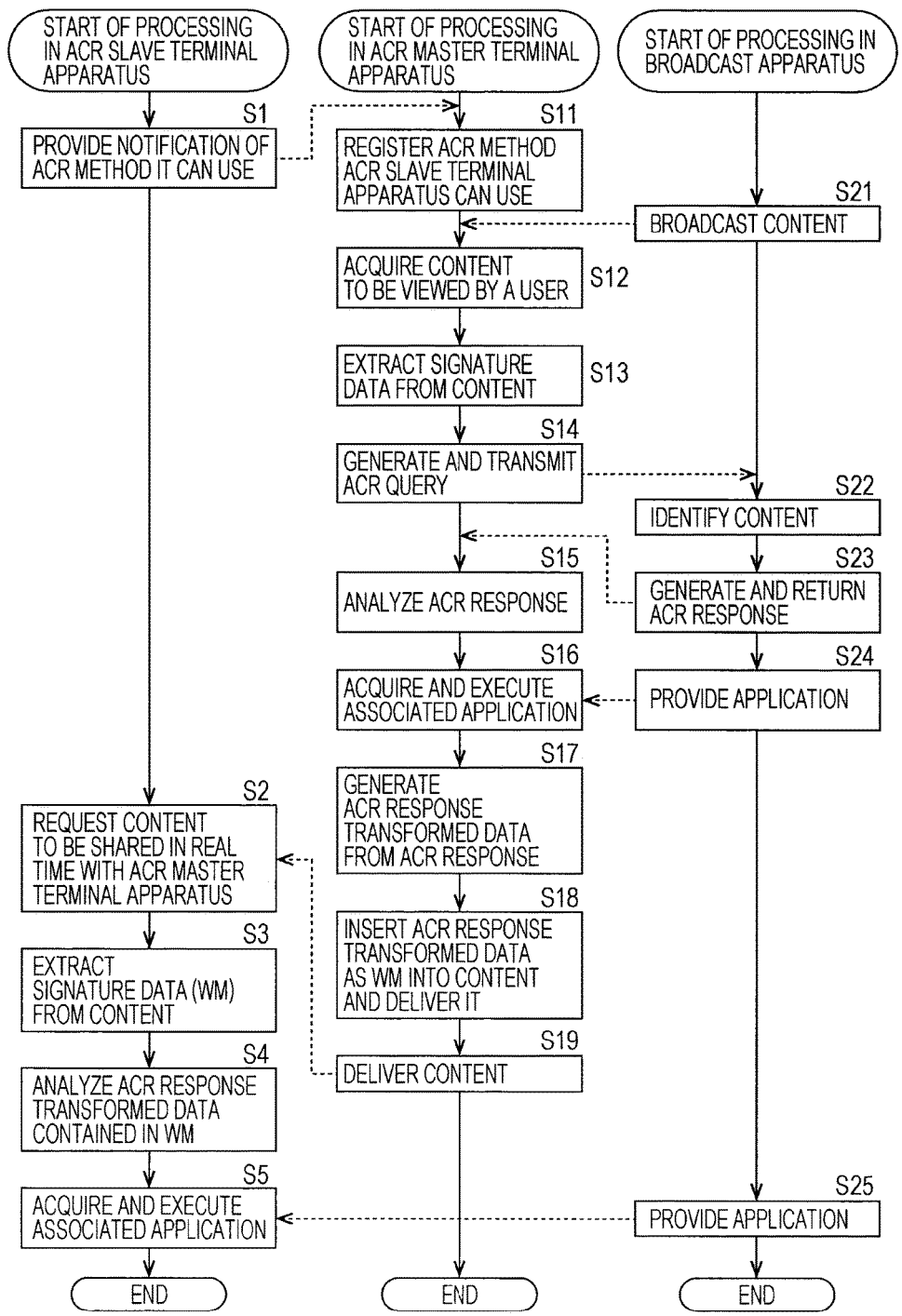
FIG. 6 is a flowchart illustrating a first operation example of the ACR system.

FIG. 6 is a flowchart illustrating an operation (hereinafter, referred to as first operation example) when content received and reproduced by an AV apparatus (for example, a TV receiver) with the built-in ACR master terminal apparatus 30 is shared in real time with an AV apparatus (for example, a tablet PC) with the built-in ACR slave terminal apparatus 50.

In step S1, the ACR client 52 of the ACR slave terminal apparatus 50 notifies the ACR master terminal apparatus 30 of information representing an ACR method that it can use. Upon reception of the notification, in step S11, the local ACR configuration management unit 36 of the ACR master terminal apparatus 30 registers the ACR method that the ACR client 52 of the ACR slave terminal apparatus 50 can use. The registration of the information needs to be performed once. When it has already been performed, the processing in steps S1 and S11 can be omitted.

In step S21, the content server 21 of the broadcast apparatus 20 broadcasts content via the broadcast network 11. The AV apparatus with the built-in ACR master terminal apparatus 30 receives it, and a user starts viewing it. In step S12, the content acquisition unit 31 acquires and branches the content to provide it to the ACR clients 32-1 to 32-M and the ACR transformation unit 34.

In step S13, the ACR client 32 extracts the signature data 64 from the content fed from the content acquisition unit 31, according to the ACR method adopted in the corresponding ACR server 22. In step S14, the ACR client 32 generates the ACR query 60 including the extracted signature data 64, and transmits it to the corresponding ACR server 22 via the interactive communication network 12.

In step S22, upon receiving the ACR query 60, the ACR server 22 identifies the content being viewed on the AV apparatus with the built-in ACR master terminal apparatus 30, based on the signature data 64 included in the ACR query 60. Then, in step S23, the ACR server 22 generates the ACR response 70 including results of the identification, and returns it to the corresponding ACR client 32. Here, suppose that the content can be identified, and the ACR response 70 shown in A of FIG. 3 is returned.

In step S15, upon receiving the ACR response 70, the ACR client 32 analyzes the ACR response 70, and notifies the application execution unit 33 of analysis results. Further, the ACR client 32 provides the received ACR response 70 to the ACR transformation unit 34.

In step S16, the application execution unit 33 requests an application associated with the content being viewed from the application server 23 via the interactive communication network 12, based on the analysis results of the ACR response 70. Then, the application server 23 retrieves content to be provided and performs provision in step S24.

In step S17, the ACR transformation unit 34 summarizes the ACR response 70 fed from the ACR client 32, generating the ACR response transformed data 90. Then in step S18, the ACR transformation unit 34 generates a WM as signature data that can be extracted by the ACR client 52 of the ACR slave terminal apparatus 50, with the generated ACR response transformed data contained therein. Further, the ACR transformation unit 34 inserts the WM in the content provided from the content acquisition unit 31, and outputs it to the local content holding unit 35, in which it is held.

On the other hand, in step S2, the AV apparatus with the built-in ACR slave terminal apparatus 50 requests the content to be shared in real time. In response to this request, in step S19, the local content holding unit 35 of the ACR master terminal apparatus 30 delivers the required content in which the WM is inserted to the AV apparatus with the built-in ACR slave terminal apparatus 50. The delivered content is reproduced by the AV apparatus with the built-in ACR slave terminal apparatus 50. In conjunction with this, the content acquisition unit 51 branches the content and provides it to the ACR client 52.

In step S3, the ACR client 52 of the ACR slave terminal apparatus 50 extracts the signature data (in the present case, the WM) from the content branched by the content acquisition unit 51. In step S4, the ACR client 52 analyzes the ACR response transformed data 90 contained in the extracted WM, and notifies the application execution unit 53 of analysis results.

In step S5, the application execution unit 53 requests an application associated with the content being viewed from the application server 23 via the interactive communication network 12, based on the analysis results on the ACR response transformed data 90. Then, the application server 23 retrieves content to be provided and performs provision in step S25. This is the end of the explanation of the first operation example.

According to the first operation example of the ACR system 10 described above, content being viewed on an AV apparatus with the built-in ACR master terminal apparatus 30 can be transferred to and shared with an AV apparatus with the built-in ACR slave terminal apparatus 50 in real time. Further, the ACR slave terminal apparatus 50 can obtain information such as identification results of shared content and an application to be executed accordingly only by extracting signature data (WM) from the content without using the ACR server 22. In other words, the ACR client 32 of the ACR master terminal apparatus 30 and the ACR client 52 of the ACR slave terminal apparatus 50 do not request the ACR server 22 to identify common content, thus being able to efficiently use the ACR service.

Figure 7:
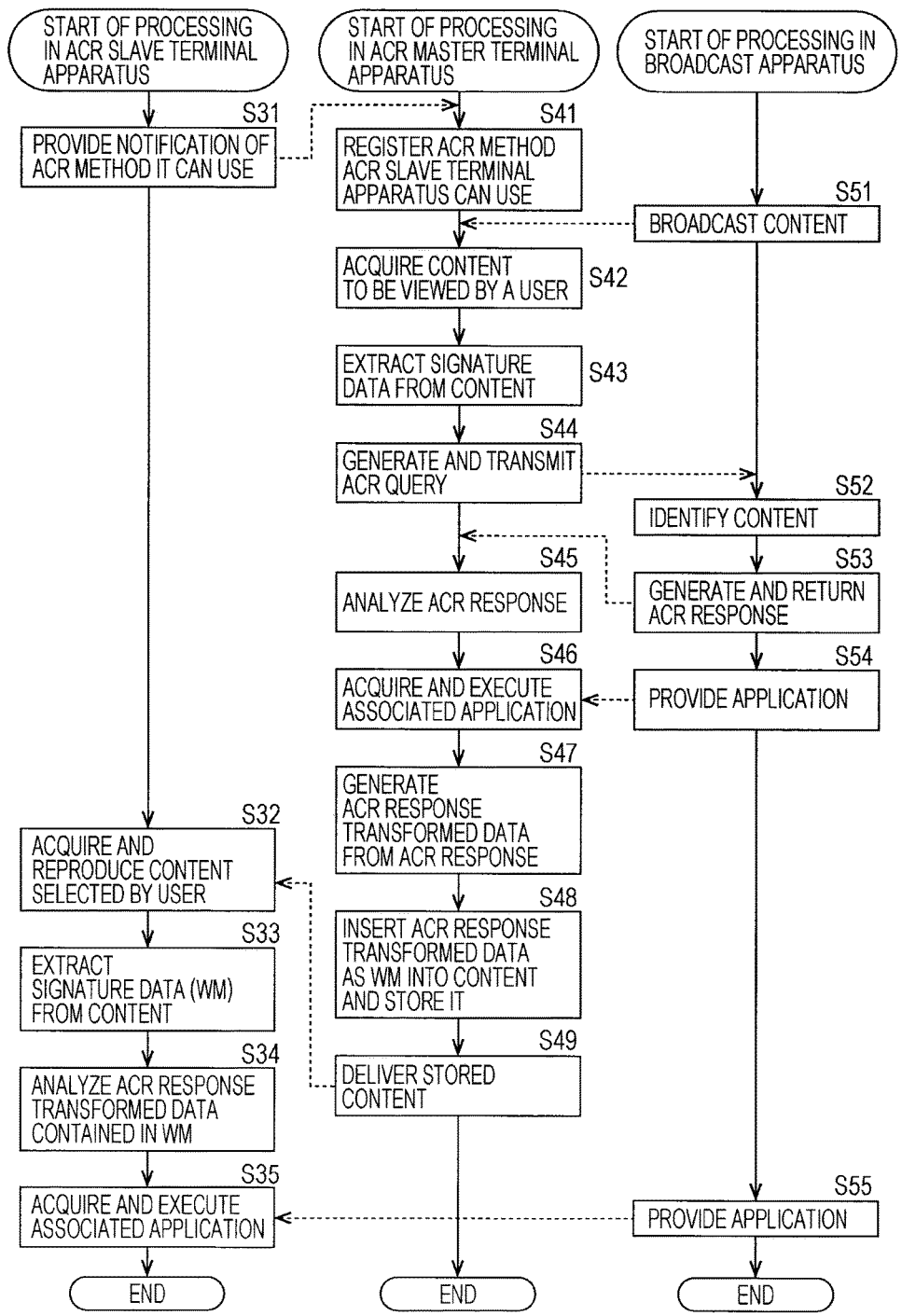
FIG. 7 is a flowchart illustrating a second operation example of the ACR system.

Next, FIG. 7 is a flowchart illustrating an operation (hereinafter, referred to as second operation example) when content received and reproduced by an AV apparatus (for example, a TV receiver) with the built-in ACR master terminal apparatus 30 is shared by an AV apparatus (for example, a tablet PC) with the built-in ACR slave terminal apparatus 50 at a later timing.

In step S31, the ACR client 52 of the ACR slave terminal apparatus 50 notifies the ACR master terminal apparatus 30 of information representing an ACR method that it can use. Upon reception of the notification, in step S41, the local ACR configuration management unit 36 of the ACR master terminal apparatus 30 registers the ACR method that the ACR client 52 of the ACR slave terminal apparatus 50 can use. The registration of the information needs to be performed once. When it has already been performed, the processing in steps S31 and S41 can be omitted.

In step S51, the content server 21 of the broadcast apparatus 20 broadcasts content via the broadcast network 11. The AV apparatus with the built-in ACR master terminal apparatus 30 receives it, and a user starts viewing it. In step S42, the content acquisition unit 31 acquires and branches the content to provide it to the ACR clients 32-1 to 32-M and the ACR transformation unit 34.

In step S43, the ACR client 32 extracts the signature data 64 from the content fed from the content acquisition unit 31, according to the ACR method adopted in the corresponding ACR server 22. In step S44, the ACR client 32 generates the ACR query 60 including the extracted signature data 64, and transmits it to the corresponding ACR server 22 via the interactive communication network 12.

In step S52, upon receiving the ACR query 60, the ACR server 22 identifies the content being viewed on the AV apparatus with the built-in ACR master terminal apparatus 30, based on the signature data 64 included in the ACR query 60. Then, in step S53, the ACR server 22 generates the ACR response 70 including results of the identification, and returns it to the corresponding ACR client 32. Here, suppose that the content can be identified, and the ACR response 70 shown in A of FIG. 3 is returned.

In step S45, upon receiving the ACR response 70, the ACR client 32 analyzes the ACR response 70, and notifies the application execution unit 33 of analysis results. Further, the ACR client 32 provides the received ACR response 70 to the ACR transformation unit 34.

In step S46, the application execution unit 33 requests an application associated with the content being viewed from the application server 23 via the interactive communication network 12, based on the analysis results of the ACR response 70. Then, the application server 23 retrieves content to be provided and performs provision in step S54.

In step S47, the ACR transformation unit 34 summarizes the ACR response 70 fed from the ACR client 32, generating the ACR response transformed data 90. Then, in step S48, the ACR transformation unit 34 generates a WM as signature data that can be extracted by the ACR client 52 of the ACR slave terminal apparatus 50, with the generated ACR response transformed data contained therein. Further, the ACR transformation unit 34 inserts the WM in the content provided from the content acquisition unit 31, and outputs it to the local content holding unit 35, in which it is stored. The content may alternatively be stored in the local content server 41.

On the other hand, in step S32, the AV apparatus with the built-in ACR slave terminal apparatus 50 requests sharing of the content stored in the ACR master terminal apparatus 30. In response to this request, in step S49, the local content holding unit 35 of the ACR master terminal apparatus 30 delivers the required content in which the WM is inserted to the AV apparatus with the built-in ACR slave terminal apparatus 50. The delivered content is reproduced by the AV apparatus with the built-in ACR slave terminal apparatus 50. In conjunction with this, the content acquisition unit 51 branches the content and provides it to the ACR client 52.

In step S33, the ACR client 52 of the ACR slave terminal apparatus 50 extracts the signature data (in the present case, a WM) from the content branched by the content acquisition unit 51. In step S34, the ACR client 52 analyzes the ACR response transformed data 90 contained in the extracted WM, and notifies the application execution unit 53 of analysis results.

In step S35, the application execution unit 53 requests an application associated with the content being viewed from the application server 23 via the interactive communication network 12, based on the analysis results on the ACR response transformed data 90. Then, the application server 23 retrieves content to be provided and performs provision in step S55. This is the end of the explanation of the second operation example.

According to the second operation example of the ACR system 10 described above, content being viewed on an AV apparatus with the built-in ACR master terminal apparatus 30 can be transferred to and shared with an AV apparatus with the built-in ACR slave terminal apparatus 50 at a later timing. Further, the ACR slave terminal apparatus 50 can obtain information such as identification results on shared content and an application to be executed accordingly only by extracting signature data (WM) from the content without using the ACR server 22. In other words, the ACR client 32 of the ACR master terminal apparatus 30 and the ACR client 52 of the ACR slave terminal apparatus 50 do not request the ACR server 22 to identify common content, thus being able to efficiently use the ACR service.

Figure 8:
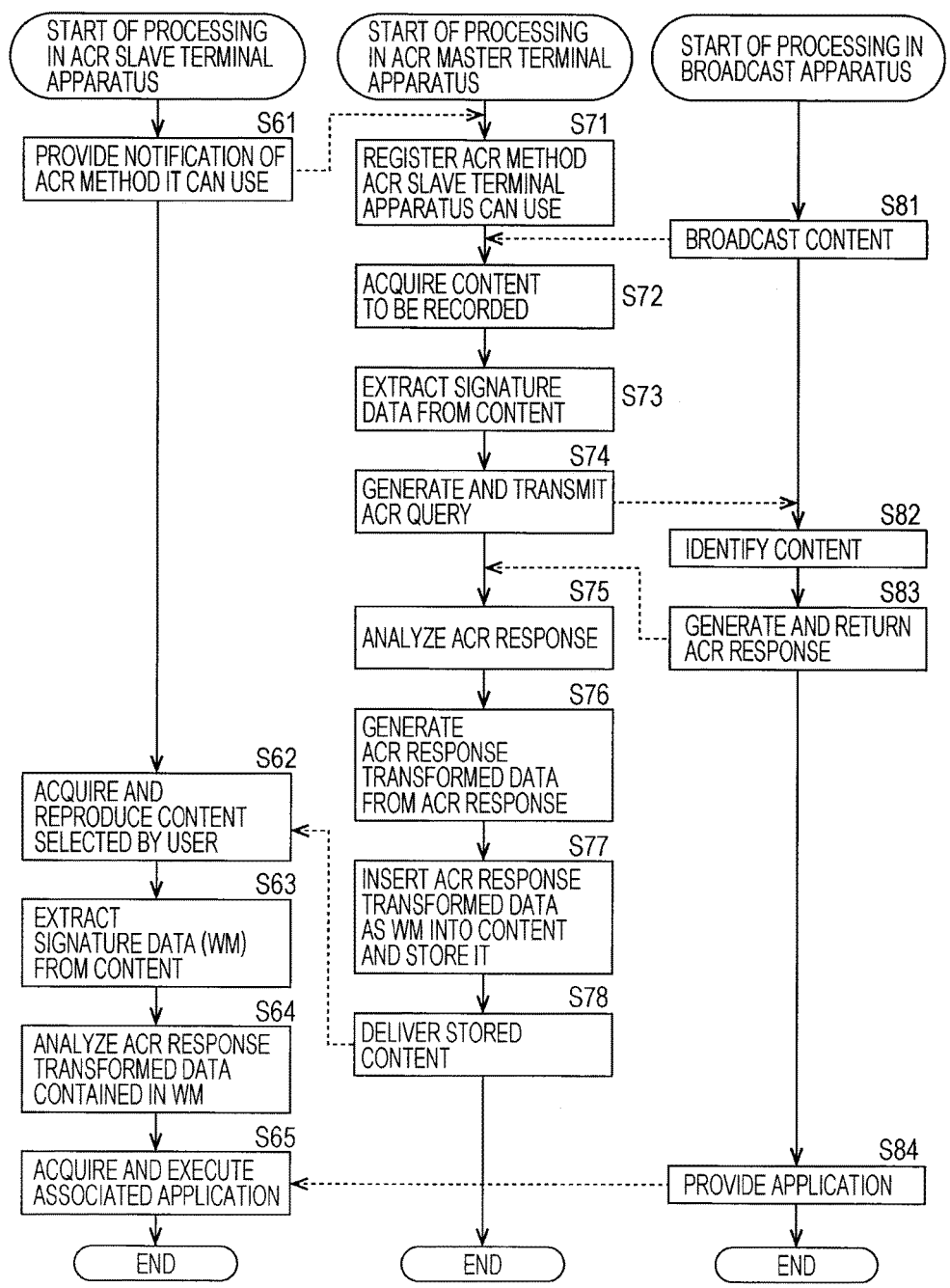
FIG. 8 is a flowchart illustrating a third operation example of the ACR system.

Next, FIG. 8 is a flowchart illustrating an operation (hereinafter, referred to as third operation example) when content received and recorded by an AV apparatus (for example, a video recorder) with the built-in ACR master terminal apparatus 30 is shared by an AV apparatus (for example, a tablet PC) with the built-in ACR slave terminal apparatus 50 at a later timing.

In step S61, the ACR client 52 of the ACR slave terminal apparatus 50 notifies the ACR master terminal apparatus 30 of information representing an ACR method that it can use. Upon receiving the notification, in step S71, the local ACR configuration management unit 36 of the ACR master terminal apparatus 30 registers the ACR method that the ACR client 52 of the ACR slave terminal apparatus 50 can use. The registration of the information needs to be performed once. When it has already been performed, the processing in steps S61 and S71 can be omitted.

In step S81, the content server 21 of the broadcast apparatus 20 broadcasts content via the broadcast network 11. The AV apparatus with the built-in ACR master terminal apparatus 30 receives it and starts recording it. In step S72, the content acquisition unit 31 acquires and branches the content to provide it to the ACR clients 32-1 to 32-M and the ACR transformation unit 34.

In step S73, the ACR client 32 extracts the signature data 64 from the content fed from the content acquisition unit 31, according to the ACR method adopted in the corresponding ACR server 22. In step S74, the ACR client 32 generates the ACR query 60 including the extracted signature data 64, and transmits it to the corresponding ACR server 22 via the interactive communication network 12.

In step S82, upon receiving the ACR query 60, the ACR server 22 identifies the content being recorded by the AV apparatus with the built-in ACR master terminal apparatus 30, based on the signature data 64 included in the ACR query 60. Then, in step S83, the ACR server 22 generates the ACR response 70 including results of the identification, and transmits it to the corresponding ACR client 32. Here, suppose that the content can be identified, and the ACR response 70 shown in A of FIG. 3 is returned.

In step S75, upon receiving the ACR response 70, the ACR client 32 analyzes the ACR response 70, and notifies the application execution unit 33 of analysis results. Further, the ACR client 32 provides the received ACR response 70 to the ACR transformation unit 34.

In step S76, the ACR transformation unit 34 summarizes the ACR response 70 fed from the ACR client 32, generating the ACR response transformed data 90. Then, in step S77, the ACR transformation unit 34 generates a WM as signature data that can be extracted by the ACR client 52 of the ACR slave terminal apparatus 50, with the generated ACR response transformed data contained therein. Further, the ACR transformation unit 34 inserts the WM in the content provided from the content acquisition unit 31, and outputs it to the local content holding unit 35, in which it is stored. The content may alternatively be stored in the local content server 41. In this embodiment, content in which a WM is inserted is stored separately from that recorded by the AV apparatus (for example, a video recorder) with the built-in ACR master terminal apparatus 30. Alternatively, a WM may be inserted in content to be recorded.

On the other hand, in step S62, the AV apparatus with the built-in ACR slave terminal apparatus 50 requests sharing of the content stored in the ACR master terminal apparatus 30. In response to this request, in step S78, the local content holding unit 35 of the ACR master terminal apparatus 30 delivers the required content in which the WM is inserted to the AV apparatus with the built-in ACR slave terminal apparatus 50. The delivered content is reproduced by the AV apparatus with the built-in ACR slave terminal apparatus 50. In conjunction with this, the content acquisition unit 51 branches the content and provides it to the ACR client 52.

In step S63, the ACR client 52 of the ACR slave terminal apparatus 50 extracts the signature data (in the present case, the WM) from the content branched by the content acquisition unit 51. In step S64, the ACR client 52 analyzes the ACR response transformed data 90 contained in the extracted WM, and notifies the application execution unit 53 of analysis results.

In step S65, the application execution unit 53 requests an application associated with the content being viewed from the application server 23 via the interactive communication network 12, based on the analysis results on the ACR response transformed data 90. Then, the application server 23 retrieves content to be provided and performs provision in step S84. This is the end of the explanation of the third operation example.

According to the third operation example of the ACR system 10 described above, content recorded by an AV apparatus with the built-in ACR master terminal apparatus 30 can be transferred to and shared with an AV apparatus with the built-in ACR slave terminal apparatus 50 at a later timing. Further, the ACR slave terminal apparatus 50 can obtain information such as identification results on shared content and an application to be executed accordingly only by extracting signature data (WM) from the content without using the ACR server 22. In other words, the ACR client 32 of the ACR master terminal apparatus 30 and the ACR client 52 of the ACR slave terminal apparatus 50 do not request the ACR server 22 to identify common content, thus being able to efficiently use the ACR service.

The broadcast apparatus 20, the ACR master terminal apparatus 30, and the ACR slave terminal apparatus 50 for executing the above-described series of processing can be implemented by a computer executing software as well as each being configured by hardware. Examples of the computer include a computer incorporated in dedicated hardware, a computer such as a general-purpose personal computer capable of implementing various functions by being installed with various programs, and others.

FIG. 9 is a block diagram illustrating a configuration example of hardware of the above-described computer.

In a computer 100, a central processing unit (CPU) 101, a read-only memory (ROM) 102, and a random-access memory (RAM) 103 are interconnected via a bus 104.

An input-output interface 105 is also connected to the bus 104. An input unit 106, an output unit 107, a storage unit 108, a communication unit 109, and a drive 110 are connected to the input-output interface 105.

The input unit 106 includes a keyboard, a mouse, and a microphone, or the like. The output unit 107 includes a display and a speaker, or the like. The storage unit 108 includes a hard disk and a non-volatile memory, or the like. The communication unit 109 includes a network interface or the like. The drive 110 drives a removable medium 111 such as a magnetic disk, an optical disk, a magneto-optical disk, or a semiconductor memory.

In the computer 100 configured as above, the CPU 101 loads a program stored in the storage unit 108 into the RAM 103 via the input-output interface 105 and the bus 104, and executes it, thereby performing the above-described series of processing, for example.

The program executed by the computer 100 (CPU 101) can be recorded in the removable medium 111 as a package medium or the like to be provided, for example. Alternatively, the program can be provided via a wired or wireless transmission medium such as a local area network, the Internet, or digital satellite broadcasting.

In the computer 100, the program can be installed into the storage unit 108 via the input-output interface 105 by inserting the removable medium 111 into the drive 110. Alternatively, the program can be received by the communication unit 109 via a wired or wireless transmission medium and installed in the storage unit 108. Other than that, the program can be installed in advance in the ROM 102 or the storage unit 108.

The program executed by the computer 100 may be a program in which processing is performed on a time-series basis in the order described in the description, or may be a program in which processing is performed in parallel or at a necessary timing such as when a call is made.

An embodiment of the present disclosure is not limited to the above-described embodiment, and various changes may be made without departing from the scope of the present disclosure.

REFERENCE SIGNS LIST

10 ACR system
11 Broadcast network
12 Interactive communication network
20 Transmission apparatus
21 Content server
22 ACR server
23 Application server 24 Metadata server
30 ACR master terminal apparatus
31 Content acquisition unit
32 ACR client
33 Application execution unit
34 ACR transformation unit
35 Local content holding unit
    Local ACR configuration management unit
40 Home network
41 Local content server
50 ACR slave terminal apparatus
51 Content acquisition unit
52 ACR client
53 Application execution unit
60 ACR query
70 ACR response
90 ACR response transformed data
100 Computer
101 CPU

The invention claimed is:

1. An information processing apparatus that shares content with a different information processing apparatus via a network, the information processing apparatus comprising:
   circuitry configured to
      acquire content;
      extract first signature data from the acquired content;
      transmit a query including the first signature data to a content identification server;
      receive a response from the content identification server in response to the query, the response including identification of the content and including an indication of an application to be executed in synchronization with reproduction of the content;
      generate second signature data that can be extracted by the different information processing apparatus different from the content identification server, the second signature data including at least the identification of the content and including the indication of the application to be executed in synchronization with reproduction of the content, and insert the second signature data into the acquired content; and
      provide the content in which the second signature data is inserted to the different information processing apparatus.

2. The information processing apparatus according to claim 1, wherein the circuitry further manages the kind of signature data that can be extracted by the different information processing apparatus.

3. The information processing apparatus according to claim 1, wherein the circuitry further acquires and executes the application to be executed in synchronization with the progress of the content, based on the response from the content identification server.

4. The information processing apparatus according to claim 1, wherein
   the first signature data is a digital fingerprint (FP), and
   the second signature data is a digital watermark (WM).

5. The information processing apparatus according to claim 1, wherein the first and second signature data are digital watermarks (WMs).

6. An information processing method for an information processing apparatus that shares content with a different information processing apparatus via a network, the information processing method comprising:
   by the information processing apparatus,
      acquiring content;
      extracting first signature data from the acquired content;
      transmitting a query including the first signature data to a content identification server;
      receiving a response from the content identification server in response to the query, the response including identification of the content and including an indication of an application to be executed in synchronization with reproduction of the content;
      generating second signature data that can be extracted by the different information processing apparatus different from the content identification server, the second signature data including at least the identification of the content and including the indication of the application to be executed in synchronization with reproduction of the content, and inserting the second signature data into the acquired content; and
      providing the content in which the second signature data is inserted to the different information processing apparatus.

7. A non-transitory computer-readable storage medium storing computer-readable instructions thereon, which, when executed by a computer that shares content with a different information processing apparatus via a network, cause the computer to perform a method comprising:
   acquiring content;
   extracting first signature data from the acquired content;
   transmitting a query including the first signature data to a content identification server;
   receiving a response from the content identification server in response to the query, the response including identification of the content and including indication of an application to be executed in synchronization with reproduction of the content;
   generating second signature data that can be extracted by the different information processing apparatus different from the content identification server, the second signature data including at least the identification of the content and including the indication of the application to be executed in synchronization with reproduction of the content, and inserting the second signature data into the acquired content; and
   providing the content in which the second signature data is inserted to the different information processing apparatus.

8. An information processing apparatus comprising:
   circuitry configured to
      acquire content provided from a different information processing apparatus;
      extract signature data from the acquired content, the extracted signature data including at least identification of the content and including indication of an application to be executed in synchronization with reproduction of the content, the identification of the content and the indication of the application are received by the different information processing apparatus from a content identification server; and
      execute predetermined processing, based on the extracted signature data.

9. The information processing apparatus according to claim 8, wherein
   the extracted signature data includes related metadata including the indication of the application to be executed in synchronization with reproduction of the content, and
   the circuitry acquires and executes the application based on the related metadata.

10. The information processing apparatus according to claim 9, wherein the signature data is a digital watermark (WM).

11. An information processing method for an information processing apparatus, comprising:
by the information processing apparatus,
acquiring content provided from a different information processing apparatus;
extracting signature data from the acquired content, the extracted signature data including at least identification of the content and including indication of an application to be executed in synchronization with reproduction of the content, the identification of the content and the indication of the application are received by the different information processing apparatus from a content identification server; and
executing predetermined processing, based on the extracted signature data.

12. A non-transitory computer-readable storage medium storing computer-readable instructions thereon, which, when executed by a computer, cause the computer to perform a method comprising:
acquiring content provided from a different information processing apparatus;
extracting signature data from the acquired content, the extracted signature data including at least identification of the content and including indication of an application to be executed in synchronization with reproduction of the content, the identification of the content and the indication of the application are received by the different information processing apparatus from a content identification server; and
executing predetermined processing, based on the extracted signature data.

13. A content sharing system comprising a first information processing apparatus and a second information processing apparatus, wherein
the first information processing apparatus comprises circuitry configured to:
acquire content;
extract first signature data from the acquired content;
transmit a query including the first signature data to a content identification server;
receive a response from the content identification server in response to the query, the response including identification of the content and including indication of an application to be executed in synchronization with reproduction of the content;
generate second signature data that can be extracted by the second information processing apparatus, the second signature data including at least the identification of the content and including the indication of the application to be executed in synchronization with reproduction of the content, and insert the second signature data into the acquired content; and
provide the content in which the second signature data is inserted to the second information processing apparatus, and
the second information processing apparatus comprises circuitry configured to:
acquire the content provided from the first information processing apparatus;
extract the second signature data from the acquired content; and
execute predetermined processing, based on the extracted second signature data.

* * * * *